US007434049B2

(12) United States Patent
Girard et al.

(10) Patent No.: US 7,434,049 B2
(45) Date of Patent: Oct. 7, 2008

(54) METHOD FOR MAKING SECURE A SESSION WITH DATA PROCESSING MEANS UNDER THE CONTROL OF SEVERAL ENTITIES

(75) Inventors: Pierre Girard, La Destrousse (FR); Jean-Luc Giraud, London (GB)

(73) Assignee: Gemplus, Gemenos (FR)

( * ) Notice: Subject to any disclaimer, the term of this patent is extended or adjusted under 35 U.S.C. 154(b) by 739 days.

(21) Appl. No.: 10/343,112

(22) PCT Filed: Jul. 26, 2001

(86) PCT No.: PCT/FR01/02454

§ 371 (c)(1),
(2), (4) Date: Jan. 28, 2003

(87) PCT Pub. No.: WO02/11363

PCT Pub. Date: Feb. 7, 2002

(65) Prior Publication Data

US 2003/0169884 A1    Sep. 11, 2003

(30) Foreign Application Priority Data

Jul. 28, 2000  (FR)  .................................. 00 10025

(51) Int. Cl.
*H04L 9/00* (2006.01)
(52) U.S. Cl. ..................................................... 713/168
(58) Field of Classification Search .................. 713/171, 713/169, 168, 150; 726/9
See application file for complete search history.

(56) References Cited

U.S. PATENT DOCUMENTS 5,799,085 A * 8/1998 Shona ........................ 713/169
6,148,404 A * 11/2000 Yatsukawa ..................... 726/2
7,096,494 B1 * 8/2006 Chen ............................. 726/9

OTHER PUBLICATIONS

Me L. et al., "Le Commerce Electronique: Un etat de L'Art" Annals of Telecommunications, CH, Pre SSES, Polytechniques Et Universitaires Romandes, Lausanne, vol. 53, No. 9/10, Sep. 1, 1998, pp. 361-376.
Menezes, Oorschot, Vanstone: "Handbook of Applied Cryptography", 1997, CRC Press, pp. 403-405 and pp. 506-509.

* cited by examiner

*Primary Examiner*—Emmanuel L Moise
*Assistant Examiner*—Ali S Abyaneh
(74) *Attorney, Agent, or Firm*—Buchanan Ingersoll & Rooney PC

(57) ABSTRACT

A method for securing the execution of a session with a data processor, such as a smart card, under the control of at least two entities, such as servers. Session numbers and session keys are transmitted to the entities. The session number and key are applied to an algorithm in the data processor and the respective entity to produce a result and signature. The results and the signatures are transmitted to the data processor. A session corresponding to the results from the data processor is executed when the signatures are identical to the results. In another embodiment, one of the entities receives a delegation of a third entity to authorize execution of the session.

20 Claims, 3 Drawing Sheets

METHOD FOR MAKING SECURE A SESSION WITH DATA PROCESSING MEANS UNDER THE CONTROL OF SEVERAL ENTITIES

This disclosure is based upon French Application No. 00/10025, filed on Jul. 28, 2000 and International Application No. PCT/FR01/02354, filed Jul. 26, 2001, the contents of which are incorporated herein by reference.

BACKGROUND OF THE INVENTION

The present invention concerns in general terms the making secure of the execution of a session with a data processing means under the control of first and second electronic entities.

For example, the data processing means is a multi-application smart card in which some resources must be accessible provided that at least two entities give authorisation to access this resource. This is because it is sometimes advantageous to make the writing in a file of a smart card or in more practical terms the debiting of an account in a card of the electronic purse type dependent on the authorisation of two electronic entities, such as bank and dispenser servers.

The present invention aims precisely to make secure the triggering of a session in the processing means, such as a smart card, under the control of at least two electronic entities.

SUMMARY OF THE INVENTION

To this end, a method for making secure the execution of a session with a data processing means under the control of at least two electronic entities is characterised in that it comprises the following steps of:

transmitting session numbers and session keys from the processing means respectively to the entities, applying the respective session number and the respective session key to a respective security algorithm in the processing means and the respective entity in order to produce a respective result and a respective signature, transmitting the respective session number and the respective signature from the respective entity to the processing means, and executing the session from the processing means when the signatures are respectively identical to the results.

So that the processing means can be assured that the execution of the requested session does indeed correspond to the session number transmitted initially, the respective results are written in memory in the processing means respectively corresponding to the respective session numbers to be transmitted to the entities and are read in correspondence with the respective session numbers transmitted by the entities to the processing means before being compared with the respective signatures.

In practice, each of the entities transmits to the processing means respective data with the respective session number and the respective signature. The data contain an agreement or refusal to execute the session. Thus the session is executed if in addition the processing means detects in each of the data an acceptance of the session by the respective entity.

According to a second embodiment, the session is executed provided that one of the said at least two entities has received respectively a delegation for the execution of a session by a third entity. In this second embodiment, the method comprises the following steps of:

transmitting respective delegation information in favour of one of the said at least two entities from a third electronic entity to the processing means, transmitting a session number, which is identical to the respective session numbers, and a third session key from the processing means to the third predetermined entity, retransmitting the session number and the third session key by the third entity to the said one entity, and applying not only the session number and the respective session key for the said one entity but also the third session key to the respective security algorithm in the said one entity and the processing means in order to produce the respective signature and the respective result.

So that the said one entity is certain that the session whose execution is requested is validated by the third entity, the session number retransmitted by the third entity and the session number transmitted directly by the processing means to the said one entity are compared in the said one entity, and at least the step of applying in the said one entity is executed only when the session numbers compared are identical.

The delegation can be transmitted to more than one entity. Thus at least one other entity of the said at least two entities is delegated from the third entity so that the session is executed only when the signatures and the results produced according to the session number, the respective session keys and the third key are respectively identical.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which.

DETAILED DESCRIPTION

Figure 1:
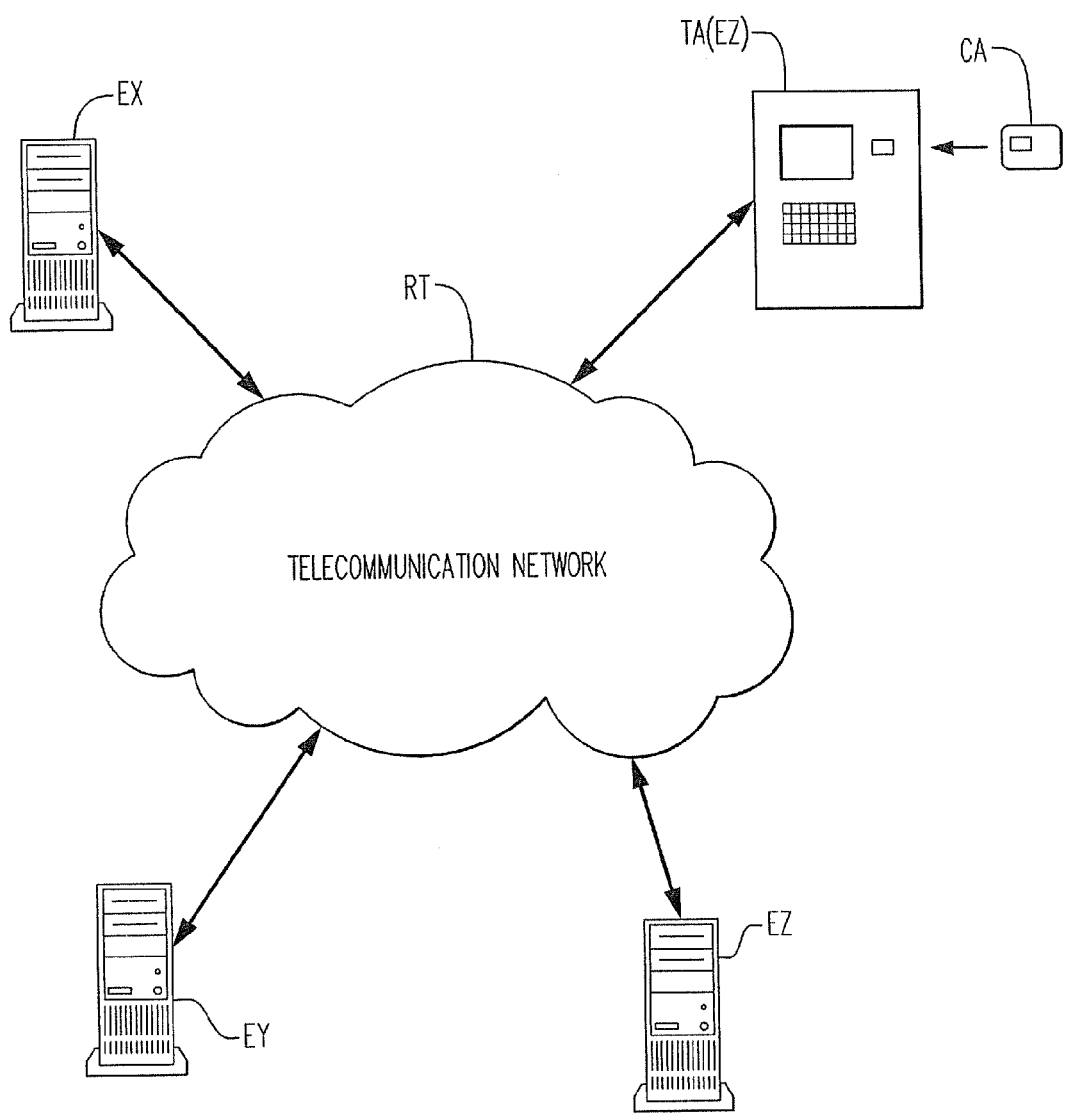
FIG. 1 is a schematic block diagram of several electronic entities and of a data processing means of the smart card type in a telecommunication network for implementing the security method according to the invention.

FIG. 1 depicts a telecommunication network RT designating overall all the telecommunication network types such as a radio telephone network, the switched telephone network, an integrated services digital network ISDN, a high-rate network such as an ATM network or the Internet, a packet transmission network etc. The network RT constitutes a means of communication between a data processing means CA and various electronic entities, three of which are depicted, EX, EY and EZ.

By way of example to which reference will be made subsequently, the data processing means is a controller, such as the microcontroller of a smart card CA, in which a session must be initiated, which may be a task to be executed in the data processing means itself or an exchange of data units, such as messages, with at least one of the entities EX, EY and EZ. Thus the data processing means can be not only a smart card, also referred to as a microcontroller card, but also any other portable electronic object, such as an electronic assistant or organiser, an electronic purse, a token or a pocket calculator.

An electronic entity, for example the entity EX or EY, is a server distant from the card CA, for example belonging to the issuer of the card CA or in relationship with one of the applications implemented in the card CA.

In a variant, the entities EX and EY are themselves smart cards housed in additional readers included in servers distant from the card CA so that two administrators, possessors of the smart cards, enable a session through the smart card of a user.

The entity EZ can be a terminal TA accepting the smart card CA, such as a banking terminal, a point of sale terminal or a mobile radio telephone terminal provided with an additional card reader, or a third server as is provided in the second embodiment described below.

According to a first embodiment of the method of the invention, the execution of a session with the smart card CA is made secure under the control of two entities EX and EY.

For example, the smart card CA is a card with a loyalty points account issued by a fuel distribution company. After insertion in a terminal TA at a service station, as the entity EZ, the card CA is enabled to be debited only by the two entities EX and EY so that the holder of the card receives the article of his choice corresponding to a debiting of points. The first entity EX is an article supplier server which simply authorises the card CA to be debited after recognition thereof. The second entity EY is a server belonging to the fuel distribution company which verifies not only the identity of the card CA but also the points account contained therein in order to authorise the debiting of the account in the card CA. Thus the session consisting here of debiting the loyalty points account in the card CA is authorised only after the identification of the card by the two entities EX and EY and the acceptance of the debiting by the entity EY, or in more global terms after the acceptance of the execution of the "debiting of points" session by the two entities EX and EY.

According to another example, the possessor of the card CA must obtain the authorisation of other two smart card possessors, as entities EX and EY, for example in order to access predetermined files in an Intranet. The "administering" cards EX and EY are then inserted in the readers of terminals in the network in order to transmit to the card CA an acceptance or refusal of the session according to rights of access to the predetermined files.

It is assumed in advance that the smart card CA is preferably proactive and can thus itself trigger actions towards the outside world consisting in particular of the telecommunication network RT through the accepting terminal TA, which is then transparent to these actions, although in a variant certain actions can be triggered by the accepting terminal TA itself. The card CA by nature has a privileged link with the entities EX and EY and contains in non-volatile memory EEPROM destination addresses ADX and ADY of the entities EX and EY, such as their telephone numbers or their IP (Internet Protocol) addresses. The non-volatile memory of the card CA also contains public enciphering keys KPX and KPY respectively associated with the entities EX and EY.

Figure 2:
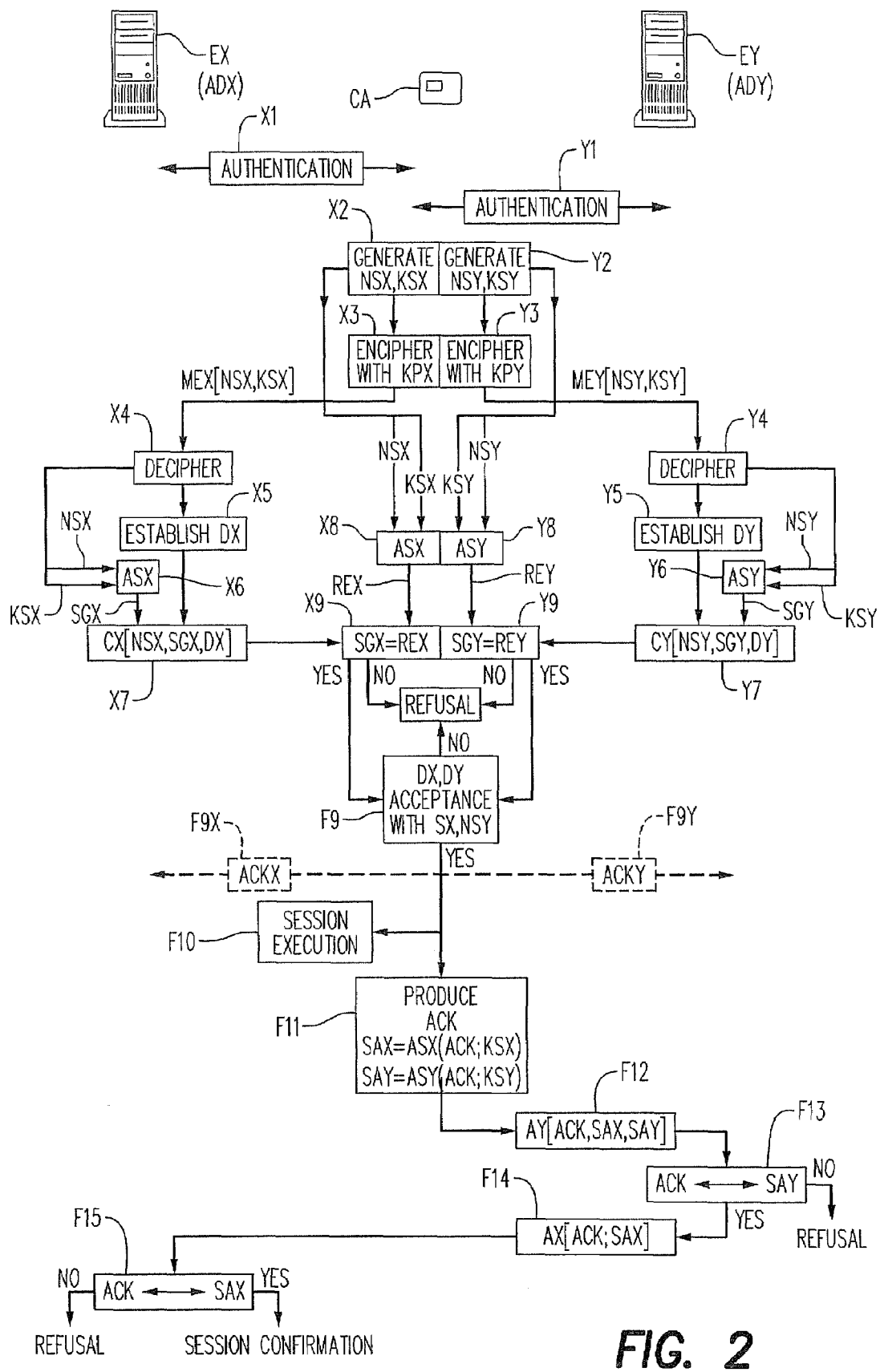
FIG. 2 is an algorithm of steps of the security method with the data processing means and two electronic entities according to a first embodiment of the invention.

The security method according to the first embodiment shown in FIG. 2 first of all comprises two sets of steps X1 to X9 and Y1 to Y9, which are respectively associated with exchanges between the card CA and the first entity EX on the one hand and the card CA and the second entity EY on the other hand, and then final steps F9 to F15. Steps X1 to X9 being respectively identical to steps Y1 to Y9, the method is first of all described in detail only for exchanges between the card CA and the first entity EX.

As soon as the card CA decides to execute a session, for example following a request from the accepting terminal TA, the card CA initiates an authentication of the card CA by the first entity EX, at step X1. The authentication is conventional and consists essentially of transmitting a random number by the first entity EX to the card CA and comparing in the entity EX the results of the application of this random number and of an authentication key both prestored in the card CA and the entity EX, performed both in the card CA and the entity EX. Conversely, the card CA authenticates the entity EX. More completely in a variant, the authentication is mutual, that is to say the authentication comprises an authentication of the card CA by the entity EX and an authentication of the entity EX by the card CA.

In a variant, the security method contains no authentication.

If after optional authentication the card CA receives no invalidation message, the card CA generates a session key KSX which may be random and associates therewith a session number NSX at step X2. Then, after having stored the key KSX and the number NSX in correspondence, the card CA prepares a message to be transmitted to the entity EX, containing the respective session number NSX and the respective session key KSX which were enciphered by means of the respective public enciphering key KPX. The enciphered message MEX thus formed is transmitted by the card CA to the entity EX at step X3.

After deciphering of the message formulated according to a private deciphering key corresponding to the public card key KPX at step X4, the entity EX establishes first data DX in particular to indicate its acceptance of the session to be executed, or where applicable its refusal, at step X5. Then the entity EX determines a signature SGX resulting from the application of the session number NSX and of the session key KSX received to a first security algorithm ASX, at step X6. The entity EX constructs a control message CX which contains the session number NSX, the signature SGX=ASX (NSX, KSX) and the data DX and which is transmitted to the card CA at step X7. The content of the control message CX is preferably enciphered in a similar manner to that of the message MEX.

In the card CA, after the transmission of the enciphered message MEX at step X3, there is also determined a result REX of the application of the session number NSX and of the session key KSX to the first security algorithm ASX, at step X8. The result REX is written in non-volatile memory in the card CA until it is read at step X9, in response to the control message CX. At this step X9, the signature SGX received by the card and corresponding to the session number NSX is compared with the result REX stored in the card. If the signature SGX is different from the result REX, the session requested by the terminal TA with the card CA is refused by the latter.

Otherwise, when the signature SGX is identical to the result REX, the method passes to the final steps since steps Y1 to Y9 also result in a step Y9 according to which a second signature SGY transmitted by the entity EY is identical to a second result REY determined by the card CA. As is clear in FIG. 2, steps Y1 to Y9 are derived from the previously described steps X1 to X9, replacing the letter X with the letter Y. Thus the second result REY results from the application in the card CA of a second session number NSY and of a session key KSY, which may be random, both generated at step Y2 by the card CA, to a second security algorithm ASY. The second signature SGY results from the application in the second entity EY at step Y4 of the session number NSY and of the session key KSY transmitted in enciphered form in a message MEY by the card CA at step Y3, to the second security algorithm ASY. The second entity EY transmits, at step Y7 also in a control message CY, preferably enciphered, the number NSY and the signature SCY as well as second data DY representing the acceptance of the execution of the session via the entity EY or a refusal thereof.

After identity of the first signature SGX and of the first result REX at step X9 and identity of the second signature SGY and of the second result REY at step Y9, the card CA compares the data DX and DY at step F9. If one or other of the data DX and DY represents a refusal, or if one NSX or the other NSY of the session numbers retransmitted by the entities EX and EY is different from the number allocated at step X2 or Y2, the session requested is not executed. Otherwise the data DX and DY represent an acceptance of the session corresponding to the numbers received NSX and NSY by the entities EX and EY and the method is continued by the execution of the session at step F10.

According to other variants of the first embodiment, the first session number NSX allocated at the data exchange between the first entity EX and the card CA and the second session number NSY allocated at the data exchange between the card CA and the second entity EY are identical, and the first and second security algorithms ASX and ASY are identical.

According to a first variant of final steps shown in short broken lines in FIG. 2, the smart card CA transmits respective acknowledgements ACKX and ACKY to the first and second entities EX and EY when both the first signature SGX is identical to the first result REX and the second signature SGY is identical to the second result REY, at steps X9 and Y9. Preferably the transmission of the first and second acknowledgements ACKX and ACKY occur rather after the final step F9, when the card CA has detected in the first and second data DX and DY an acceptance of the session by the entities EX and EY. By virtue of these two acknowledgements, the entities EX and EY each know that the other entity has accepted the session. The session can be executed at the following step F10 as illustrated in FIG. 2, or in a variant previously to the transmissions of the acknowledgements ACKX and ACKY.

According to a second variant of final steps, after the finding of the identities of signature and result at steps X9 and Y9, preferably after the detection of an acceptance of the session by the entities EX and EY, the card CA produces, at a step F11, a word ACK representing the session to be executed at a step F10. In this regard, the session can be executed at step F10 before the transmission of the word ACK at step F11 as illustrated in FIG. 2, or in a variant after step F11.

More precisely, according to this second variant, the card CA produces a first word signature SAX resulting from the application of the representative word ACK and of the first session key KSX to the first security algorithm ASX, and a second word signature SAY resulting from the application of the representative word ACK and of the second session key KSY to the second security algorithm ASY. The card CA encapsulates the word ACK and the word signatures SAX and SAY in a message AY in order to transmit it to one of the entities, for example the second entity EY, at a step F12.

The second entity EY verifies the correspondence between the received word ACK representing the session and the second respective word signature SAY according to the respective session key KSY which has been received and stored in the entity EY at step Y4, by applying the received word ACK and the key KSY to the second algorithm ASY so as to produce a result which is compared with the second received signature SAY, at a step F13. If this comparison is positive, that is to say if the received word ACK corresponds to the signature SAY, the second entity EY transmits a message AX containing the word ACK representing the session and the other signature, that is to say the first word signature SAX=ASK (ACK; KSY), to the other entity EX at a step F14. On reception of the message AX, the first entity EX verifies the correspondence between the representative word ACK and the first received word signature SAX according to the respective session key KSX which has been received and stored in the entity EX at step X4. This verification consists of applying the received word ACK and the first session key KSX to the first security algorithm ASX and comparing the result produced by this algorithm with the received signature SAX at a step F15.

If at step F13 the entity EY finds a lack of correspondence between the representative session word ACK and the second word signature SAY, the entity EY ignores the result of the session executed and does not transmit the message AX to the entity EX or transmits a negative acknowledgement message to the entity EX; in a variant, the entity EY also proceeds with a cancellation of the session when it is still to be executed in the card CA via the terminal TA. Likewise, when the first entity EX finds a lack of correspondence between the representative session word ACK and the first word signature SAX, the entity EX ignores the result of the executed session and preferably signals it to the entity EX; in a variant, the entity EX also proceeds with a cancellation of the session in the card CA when it is to be executed.

In a variant, the acknowledgement message ACKX and ACKY, and/or the messages AX and AY, are enciphered.

Although the first embodiment has been described with two entities EX and EY, the invention also encompasses embodiments with more than two entities which must each give its acceptance to the card CA according to steps X1 to X9, Y1 to Y9 in order to authorise execution of the session. In particular, for the second variant shown at the bottom of FIG. 2, step F11 produces as many word signatures SAX, SAY as there are entities EX, EY, and each of these entities performs a step F13, F15 during which it verifies the correspondence between the word ACK representing the session and the respective word signature SAX, SAY according to the respective session key KSX, KSY, and so on until the last entity.

According to a second embodiment of the security method according to the invention, a third electronic entity EZ intervenes. When the card CA decides to execute a predetermined session, it routinely interrogates the third entity EZ which does not have enough information to decide whether or not it accepts the requested session; the entity EZ then delegates this decision for a predetermined period to the first and second entities EX and EY by transmitting to them first and second delegation information IDX and IDY respectively.

According to a complementary variant, if the commands executed in the session of step F10 require the intervention of the entity EZ and if the entity EZ cannot or does not wish to intervene in this interactive exchange, the delegation enables the entity EZ to indicate to the card CA that the entity EX, EY which has received the delegation has the right to act on behalf of the entity EZ.

For example, as shown in FIG. 1, the third entity EZ, the delegator, is a server of a bank which, during an annual holiday period, allows credit to the card owner CA, and subsequently confides in a first server EX of a commercial site connected to the Internet and presenting products to be purchased and also in a second server EY of a product supplier. When the user, the delegatee, decides, by means of its own computer terminal TA connected to the network RT and provided with an additional card reader in which the card CA is inserted, to purchase a product from the server EX, this transaction is triggered by the bank server EZ which has verified that the account corresponding to the smart card CA has an authorised credit and which has the transaction relayed by the servers EX and EY, the delegates, in so far as the latter have received a validation in the form of a key KSZ supplied by the card CA and retransmitted by the server EZ, as will be seen below.

It is assumed in this second embodiment that the entities EX and EY have already had knowledge of the delegation transmitted by the third entity EZ.

Figure 3:
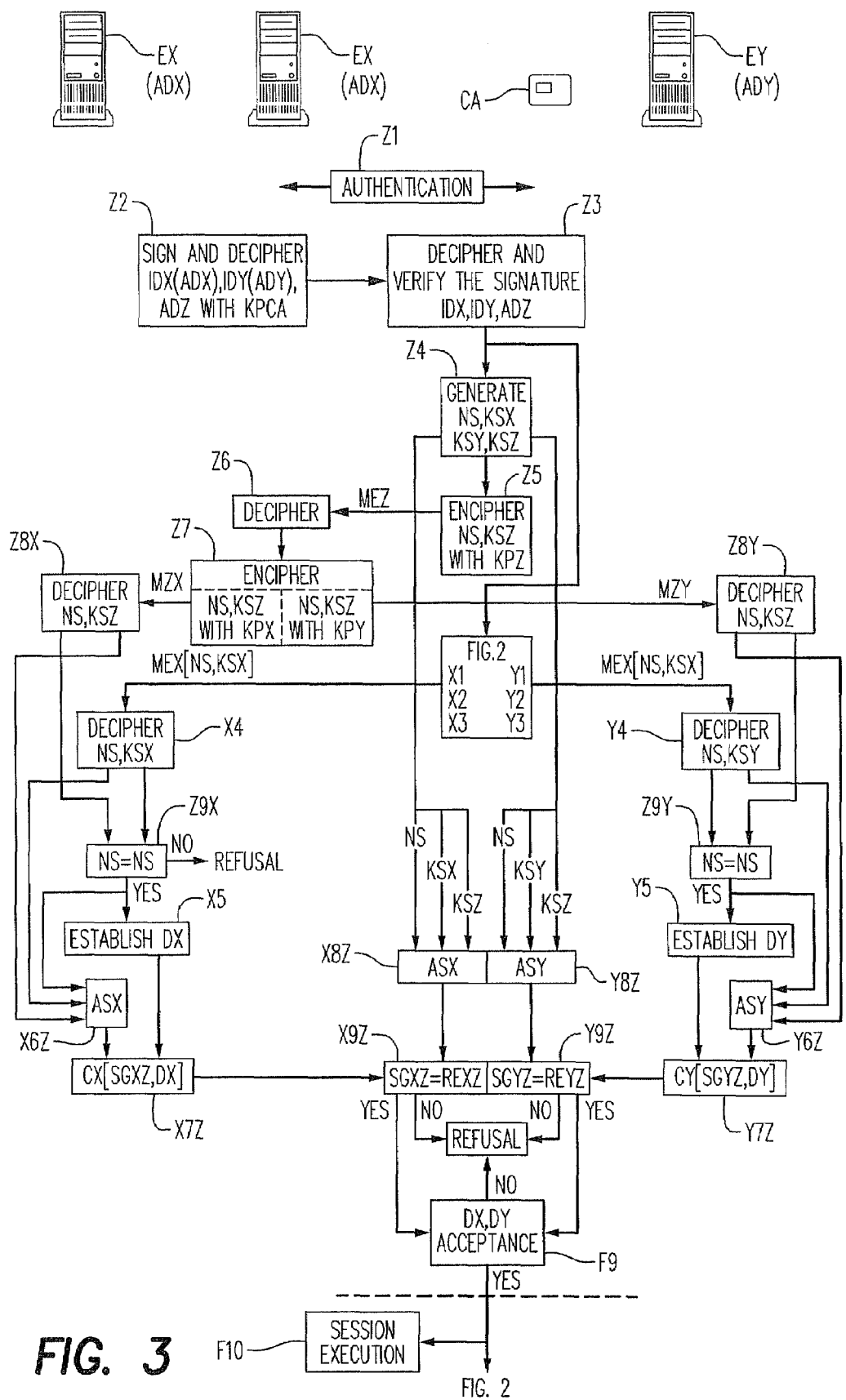
FIG. 3 is an algorithm of steps of the security method with the data processing means and a third electronic entity delegating to the previous two entities, according to a second embodiment of the invention.

As is clear by comparing FIGS. 2 and 3, the second embodiment of the method according to the invention first of all comprises steps Z1 to Z7 relating to exchanges of data between the third entity EZ and the smart card CA. In a similar manner to the first embodiment, the card CA contains in non-volatile memory the destination addresses ADX, DAY and ADZ of the entities EX, EY and EZ as well as public enciphering keys KPX, KPY and KPZ associated with these entities.

At the first step Z1, following a session execution request by the card CA transmitted to the entity EZ, the entity EZ authenticates the card CA, or in a variant the entity EZ and the card CA authenticate each other mutually.

In a variant, the second embodiment of the security method contains no authentication.

After optional authentication, the entity EZ supplies the first and second items of delegation information IDX and IDY to the card CA. Each of the first and second items of delegation information contains for example the address ADX, ADY, or other delegate identifier, of the entity EX, EY, and the number of authorities required for executing the session, that is to say the number of entities such as the entities EX and EY whose acceptance is required for executing the session. Thus, at step Z2, the third entity EZ transmits the first and second items of delegation information IDX and IDY as well as the source address ADZ of the entity EZ to the card CA in the form of a message which is signed with the private key of the third entity EZ corresponding to the public key KPZ, and then enciphered with the public key KPCA of the card CA. After deciphering, signature verification and storage of the information IDX and IY at step Z3, the card CA generates a session number NS as well as three session keys KSX, KSY and KSZ, which may be random, and associates them respectively with the entities EX, EY and EZ in correspondence with the session number NS, at step Z4. These four parameters NS, KSX, KSY and KSZ are stored in the card in order to serve in the subsequent steps.

At the following step Z5, the card CA enciphers the session number NS and the third session key KSZ with the enciphering key KPZ in order to transmit them in an enciphered message MEZ to the third entity EZ. After deciphering of the message MEZ and storage of the number NS and of the session key KSZ at step Z6, the entity EZ establishes two messages MZX and MZY transmitted respectively to the entities EX and EY. The first message MZX comprises the session number NS and the third session key KSZ and the destination address ADX which are enciphered by means of the public key KPX of the first entity EX. The second message MZY also comprises the number NS, the key KSZ and the address ADY which are enciphered by means of the public key KPY of the second entity EY. Messages MZX and MZY are respectively received by the entities EX and EY in order to be deciphered therein by means of their private enciphering keys and to be stored therein at following steps Z8X and Z8Y.

In parallel with steps Z4 to Z7, the card CA performs steps X1 to X4 and Y1 to Y4, substantially identical to those already described with reference to FIG. 2, in response to the delegation information IDX and IDY received at step Z3, so as to authenticate the card CA by means of the entities EX and EY delegated by the entity EZ and to transmit enciphered messages MEX[NS, KSX] and MEY[NS, KSY] by the card CA to the entities EX and EY and to decipher these messages at steps X4 and Y4.

Then, at a step Z9X, Z9Y in the entity EX, EY, the session number NS stored at step Z8X, Z8Y and transmitted by the third entity EZ is compared with the session number NS and transmitted by the card CA and deciphered at step X4, Y4, by analogy with the comparison of the session number received and stored NSX, NSY at step F9. If the session numbers are different, the entity EX refuses the requested session. Otherwise the two session numbers are identical and data DX, DY representing an acceptance of the session by the delegated entity EX, EY at the step where X5, Y5 are established. The method is continued with steps X6Z and X7Z, Y6Z and Y7Z replacing respectively steps X6 and X7, Y6 and Y7, and being distinguished from these by the fact that the signature SGXZ, SGYZ is determined by applying the session number NS validated at the previous step Z9X, Z9Y, the session key KSX, KSY received and deciphered at step X4 and the third session KSZ received, deciphered and stored at step Z8X, Z8Y, to the security algorithm ASX, ASY. The session number NS, the signature SGXZ, SGYZ and the data DX, DY are preferably enciphered and encapsulated in a message CXZ, CYZ which is transmitted to the card CA.

In parallel to steps X4 to X7Z, Y4 to Y7Z, a result REXZ, REYZ is determined in the card at a step X8Z, Y8Z replacing step X8, Y8, by applying the session number NS, the key KSX, KSY and the third key KSZ to the security algorithm ASX, ASY.

The following step X9Z, Y9Z in the card CA compares the signature SGXZ, SGYZ with the result REXZ, REYZ so as to pass to the final step F9 when the identities SGXZ=REXZ and SGYZ=REYZ are verified.

By virtue of the transmission of the third key KSZ by the card CA through the third entity EZ and the transmission of the keys KSX and KSY by the card CA directly to the entities EX and EY, the transmission of the signatures SGXZ and SGYZ dependent on these two pairs of keys with acceptance data DX and DY to the card CA ensure that the entities EX and EY have recovered the delegation of the entity EZ and are authorised to give the instruction to execute the number session NS by delegation.

According to a third embodiment combining the first and second embodiments, only one of the entities EX and EY, for example the first entity EX, is delegated by the third entity EZ. A session is executed only when the card CA has received the acceptance of the entity EX by delegation from the entity EZ and the acceptance of the entity EY independent of the entity EZ.

For the third embodiment, the left-hand part of the algorithm in FIG. 3 with respect to the card CA, that is to say steps Z1 to Z7 omitting IDY(ADY), KSY and KPY and steps Z8X to X9Z, is preserved, and the right-hand part of the algorithm in FIG. 3 concerning the relationships with the entity EY is replaced by the steps Y1 to Y9 to the right in FIG. 2, in order finally to compare the signature SGXZ with the result REXZ and the signature SGY with the result REY at steps X9Z and Y9 before reading the received data DX and DY in the card CA at step F9.

The invention claimed is:

1. A method for making secure the execution of a session with a data processing means under the command of at least two electronic entities, comprising the following steps:
   transmitting session numbers and session keys from the data processing means to the entities,
   applying a respective session number and a respective session key to a respective security algorithm in the data processing means and the respective entities to produce a respective result and a respective signature, transmitting the respective session number and the respective signature from the respective entities to the data processing means, and executing a session corresponding to the session numbers retransmitted from the data processing means when the signatures are respectively identical to the results.

2. A method according to claim 1, wherein the respective results are written in memory in the data processing means respectively in correspondence with the respective session numbers to be transmitted to the entities and are read in correspondence with the respective session numbers transmitted by the entities to the data processing means before being compared with the respective signatures.

3. A method according to claim 1 wherein each of the entities transmits to the processing means respective data to the data processing means with the respective session number and the respective signature, and the session is executed if the data processing means detects in each of the data an acceptance of the session by the respective entity.

4. A method according to claim 1, wherein before being transmitted from the data processing means, the respective session number and the respective session key are enciphered by a respective enciphering algorithm with a respective public key for each of the entities.

5. A method according to claim 1, wherein the data processing means transmits respective acknowledgements to the respective entities when the signatures are respectively identical to the results.

6. A method according to claim 1, wherein the data processing means produces a word representing the session when the session is to be executed, generates respective word signatures each resulting from application of said word and a respective session key to the respective security algorithm, and transmits said word and the word signatures to one of the entities to verify the correspondence between said word and the respective word signature according to the respective session key and, when there is a correspondence, to transmit said word and the other respective word signatures to another entity, which verifies the correspondence between said word and the respective word signature according to the respective session key.

7. A method according to claim 1, further including an initial authentication of the data processing means by the entities and/or vice-versa.

8. A method according to claim 1, further including the following steps:

transmitting respective delegation information relating to said two entities from a third electronic entity to the data processing means, transmitting a session number and a third session key from the data processing means to the third entity, retransmitting the session number and the third session key by the third entity to one of said two entities, and applying the session number, the respective session key for said one entity and the third session key to the respective security algorithm in said one entity and the data processing means to produce a respective signature and a respective result.

9. A method according to claim 8, wherein the delegation information is signed with a private key of the third entity and enciphered with a public key of the data processing means.

10. A method according to claim 8, wherein the session number retransmitted by the third entity and the session number transmitted directly by the data processing means to said one entity are compared in said one entity, and at least the step of applying in said one entity is executed only when the compared session numbers are identical.

11. A method according to claim 8, wherein before being transmitted and retransmitted, the session number and the third session key are enciphered with a third public key of the third entity, and with a public key of said one entity.

12. A method according to claim 8, wherein at least one other entity of said at least two entities is delegated by the third entity so that the session is executed only when the signatures and the results produced according to the session number, the respective session keys and the third session are identical.

13. A method according to claim 1, wherein at least one of the data processing means and the entities is a smart card.

14. A method for conducting a secure session between a smart card and at least one entity, comprising the following steps:

transmitting session numbers and session keys from the smart card to said one entity and at least one other entity, applying a received session number and a received session key to a security algorithm in each of said one entity and said other entity, to produce respective signatures, applying the transmitted session numbers and session keys to respective security algorithms in said smart card, to produce respective results, transmitting the session numbers and the signatures produced in the respective entities to the smart card, comparing the received signatures with the respective results in the smart card, and executing a session corresponding to the session number between the smart card and said one entity when the signatures are identical to the respective results.

15. A method according to claim 14 wherein each of said entities transmits respective data to the smart card with its respective session number and signature, and the session is executed if the smart card detects an acceptance of the session in the data received from each entity.

16. A method according to claim 14, wherein the session numbers and the session keys are encrypted by a respective encryption algorithm with a respective public key for each of the entities, before being transmitted from the smart card.

17. A method according to claim 14, wherein the smart card transmits acknowledgements to the respective entities when the signatures are identical to the respective results.

18. A method according to claim 14, further including the following steps:

transmitting respective delegation information relating to said one entity and said other entity from a third entity to the smart card, transmitting a session number and a third session key from the smart card to the third entity, retransmitting the session number and the third session key by the third entity to said one entity, and applying the session number, the session key for said one entity and the third session key to the security algorithm in said one entity and the smart card to produce a respective signature and a respective result.

19. A method according to claim 18, wherein the delegation information is signed with a private key of the third entity and enciphered with a public key of the smart card.

20. A method according to claim 18, wherein the session number retransmitted by the third entity and the session number transmitted directly by the smart card to said one entity are compared in said one entity, and the step of applying in said one entity is executed only when the compared session numbers are identical.

* * * * *